Aug. 28, 1923.

H. C. GOTTSCHALT

CABLE END CONNECTION

Filed Aug. 16, 1920

1,466,127

Inventor,
Henry C. Gottschalt
By Hull, Smith, Brock & West
Attys.

Patented Aug. 28, 1923.

1,466,127

UNITED STATES PATENT OFFICE.

HENRY C. GOTTSCHALT, OF BRATENAHL, OHIO.

CABLE-END CONNECTION.

Application filed August 16, 1920. Serial No. 403,916.

*To all whom it may concern:*

Be it known that I, HENRY C. GOTTSCHALT, a citizen of the United States, residing at Bratenahl, in the county of Cuyahoga and State of Ohio, have invented a certain new and useful Improvement in Cable-End Connections, of which the following is a full, clear, and exact description, reference being had to the accompanying drawings.

Figure 1:
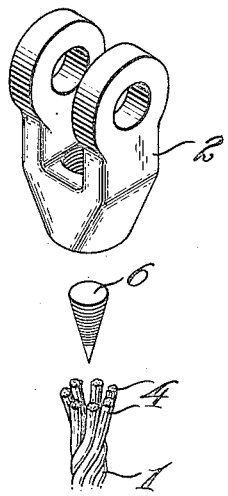
Figure 2:
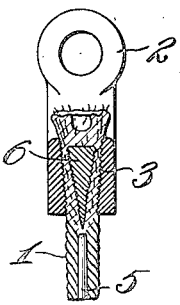

The aim of this invention is to provide a simple and inexpensive yet highly efficient cable end connection that is capable of withstanding a tensile strain substantially equal to or greater than the tensile capacity of the cable. I carry out my invention in the manner, and by the use of the elements, illustrated in the accompanying drawing wherein Fig. 1 represents the elements, including the flared end of a wire cable, in separated condition; and Fig. 2 is a sectional view through a connection made in accordance with my invention.

In the present illustration I have shown a cable which is connected to a yoke-end 2—although the latter, so far as my invention is concerned, might be any element to which it is desired to attach the cable. The shank of the yoke-end or element 2 is provided with a tapered bore 3 through which, from its smaller toward its larger end, the separated strands 4 of the cable 1 are adapted to be inserted. Cables of the character herein dealt with are usually comprised of a center core 5 which may be of some fibrous material about which the strands 4 are spirally wound. Before making the connection, the core 5 may be cut off a distance inwardly of the ends of the strands. With the ends of the strands spread out into contact with the wall of the bore 3, a conical shaped spreader 6 of relatively hard material, such as brass or steel, is inserted into the end of the cable and the whole is then firmly drawn down into the bore 3 with the ends of the strands projecting a material distance above the end of the bore. To increase the effectiveness of the bite upon the strands of the cable the angle of convergence of the walls of the spreader 6 is greater than that of the walls of the bore 3 causing the space between the walls of said parts to decrease in width as it increases in circumference. It is self evident that this is conducive of a more uniform grip upon the strands of the cable because the mass of the strands becomes thinner as the circle about which they are distributed becomes greater in diameter. With the parts in the condition above described, molten solder is poured into the cavity provided with the projecting ends of the cable strands and it flows down about the cable strands and the spreader 6 into the bore 3, thoroughly filling the interstices of the cable and the space between the walls of the bore and spreader.

In order to enhance the holding power of the connection by providing an actual interlocking between the elements, I preferably groove or corrugate the bore 3 and spreader 6. As an economical commercial proposition, the surface of the bore may be grooved by threading it with a tapered tap. When the solder hardens, the various elements are amalgamated or consolidated, so to speak, into a substantially integral mass, and a connection is produced which will not only withstand the severest tensile strains that can be imposed upon the cable, but one that is unaffected by any vibration to which the connection may be subjected, as, for instance, when it is used in automobile construction as a part of the brake equipment.

Having thus described my invention, what I claim is:—

In a cable end connection of the character specified, the combination with a cable, of an element having a tapered bore through which the end of the cable is inserted from the smaller toward the larger end thereof, a spreader within the strands of the cable in opposed relation to the wall of the bore, the angle of convergence of the spreader walls being greater than that of the walls of the bore, the cable strands extending beyond the larger end of the spreader to provide a cavity within the strands, and a deposit of binding metal within said cavity connecting the ends of the strands beyond the larger end of the spreader.

In testimony whereof, I hereunto affix my signature.

HENRY C. GOTTSCHALT.